United States Patent

[11] 3,617,882

[72] Inventors Ken Y. Ishikawa
Bellflower;
Charles R. Johnson, La Mirada, both of Calif.
[21] Appl. No. 842,503
[22] Filed July 17, 1969
[45] Patented Nov. 2, 1971
[73] Assignee North American Rockwell Corporation

[54] SPECTRUM ANALYZER WITH VARIABLE NORMALIZING MEANS AND MEANS FOR INDICATING THE DEGREE OF NORMALIZATION
3 Claims, 9 Drawing Figs.

[52] U.S. Cl. ................................................. 324/77 E
[51] Int. Cl. ..................................................... G01r 23/16
[50] Field of Search .......................................... 324/77, 102; 346/33

[56] References Cited
UNITED STATES PATENTS
2,938,079  5/1960  Flanagan .................. 324/77 (E) X
3,180,445  4/1965  Schwartz et al. ........... 324/77 (E) UX
3,471,648  10/1969 Miller ....................... 324/77 (G) X OTHER REFERENCES
Dervan, IBM Tech. Bul. Vol. 6, No. 11; April 64. Copy in 324/102.

Primary Examiner—Alfred E. Smith
Attorneys—William R. Lane, Allan Rothenberg and Sidney Magnes ABSTRACT: A number of signals that can vary over a wide dynamic range and having a broad range of low-frequency variation are processed by long term integration circuits and then selectably switched for recording or display of an accurate and precision representation of frequency components and amplitudes. Precision processing of the signals is enabled by an electronic data-normalizing system that is interposed between the bank of input filters and the processing equipment. The recording or display includes an arrangement for sensing a unique phenomenon in the signals being received and initiating operation of the recorder at such time so as to record anomalous conditions. Information displayed is accompanied by a reference signal having a predetermined magnitude and coded to indicate a range of magnitude variations of the incoming signals.

INVENTOR.
KEN Y. ISHIKAWA
CHARLES R. JOHNSON

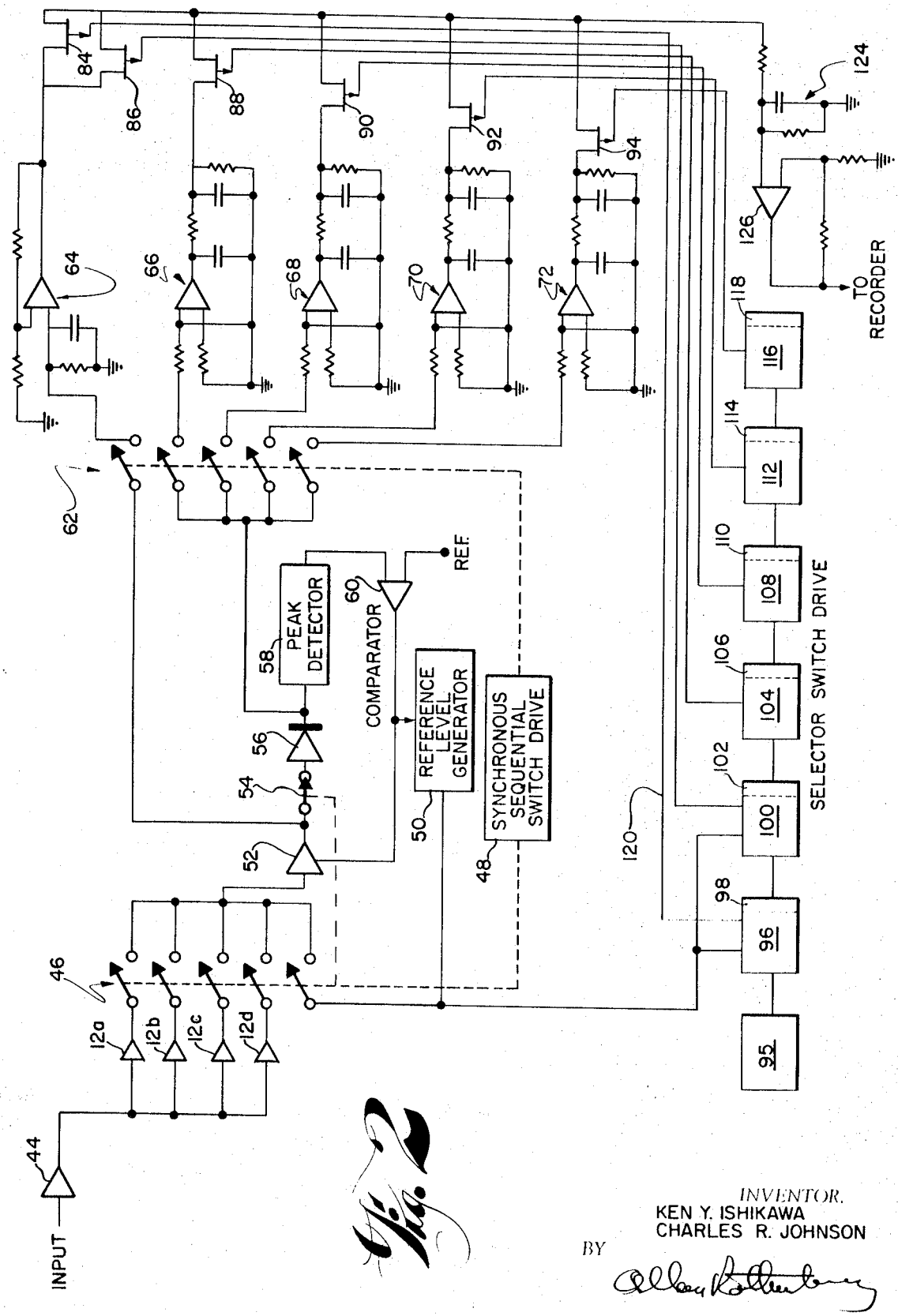

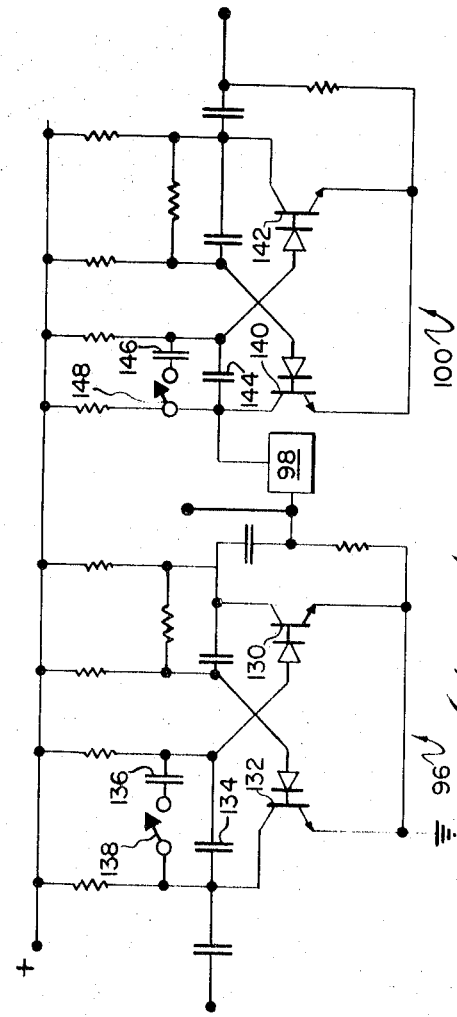
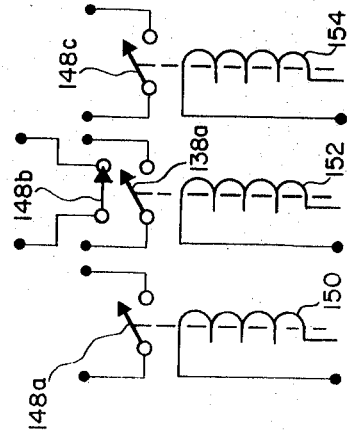
Fig. 6
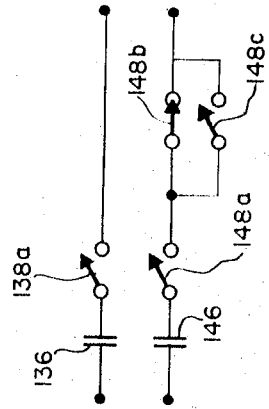
Fig. 5
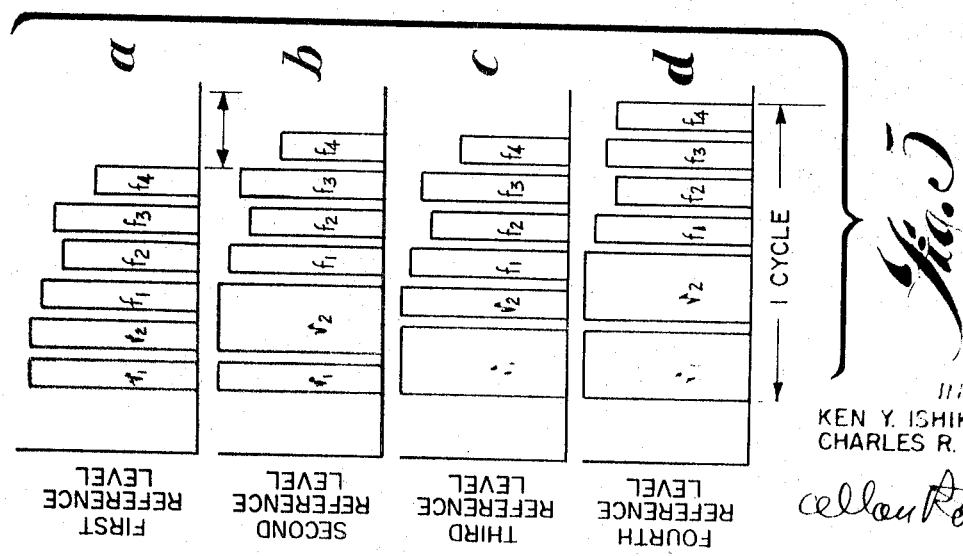
Fig. 3
INVENTOR
KEN Y. ISHIKAWA
CHARLES R. JOHNSON

SPECTRUM ANALYZER WITH VARIABLE NORMALIZING MEANS AND MEANS FOR INDICATING THE DEGREE OF NORMALIZATION

BACKGROUND

Geophysical experiments of a variety of types require long term collection of low-frequency data that may have a large range of dynamic variation and a variation in frequency components. Geophysical sensing is employed in analyzing magnetotelluric background signals which may have a frequency variation from a period of months to kilocycles. Of particular interest are variations on the order of 0.1 to 1.0 Hz. Variometers of high sensitivity having many windings are employed for such sensing. Other sensors used to provide data on background and anomalous variation of the earth's magnetic field include earth current probes in the form of electrodes placed, in some cases, about a 1000 feet apart to monitor variation in potential that occurs in or under the earth's surface.

Spectral analysis is a powerful tool that is commonly used for study of data of this type. Such analysis requires precision information concerning frequency components contained in the information signals of interest. Energy in such signals at various frequencies is identified by integration for specified time periods of different frequency components. For online analysis of such geophysical data there is required a real-time spectrum analyzer capable of providing precision information concerning amplitudes of each of a number of frequency components in incoming signals that are subject to a wide dynamic range.

In the past, spectrum analysis including determination of energy summed over particular time intervals of various frequency components, has been performed after making a long term recording on magnetic tape. The tape is subsequently played back at high speed to shift the apparent frequency of the data to a higher frequency range where conventional analyzers may operate. In an application of C. R. Johnson for VARIABLE DISPLAY, Ser. No. 600,935 filed Dec. 12, 1966, now U.S. Pat. No. 3,487,308 there is described a spectrum analyzer that employs plural paths to transmit and process individual signals in order to enable the relatively limited range processing circuitry to handle signals of the widely varying inputs that are obtained in such geophysical sensing. Since great precision and sophistication is required in the design and manufacture of processing circuitry, the duplication of such equipment to provide dual channels for each signal is highly undesirable and, furthermore, introduces problems related to tracking of one channel with the next in order to ensure identical operation on the signal by both channels. In some prior art devices the large variation of signal amplitude has simply been neutralized so that its total effect upon a signal and the processing of equipment is eliminated whereby analysis of frequency alone may be accomplished. Such an arrangement will not permit performance of the above-described spectral analysis that is based upon precision identification of both amplitude duration and frequency.

SUMMARY

In carrying out the principles of this invention in accordance with a preferred embodiment thereof, a real-time spectrum analyzer is provided with a filter bank to separate an incoming signal into a number of frequency components. The various frequency components are fed to suitable data processing circuitry in the form of particularly designed integrating circuits that will provide the desired information concerning spectral distribution of energy levels of the incoming signal. In order to allow the precision integrators to handle incoming signals that may have a dynamic range variation of from 0 to 80 decibels, for example, and further, in order to minimize constraints caused by such amplitude variation upon the design of the integrating circuits themselves, there is provided a data-normalizing means interposed between the filter bank and the integrators whereby all signals from the data filter bank are either expanded to a near maximum value which the integrators can handle or are compressed to such value. A selector switch output scans the processed signals and displays these together with a coded reference level signal that indicates the amount of normalization of the signals for suitable review and further analysis.

Objects and advantages of the invention will become apparent from the detailed description which follows when taken in connection with the accompanying drawings in which:

FIG. 2 is a detailed diagram of the analyzer of FIG. 1;

FIGS. 3a through 3d illustrate exemplary displays of information pulses together with various coded reference level pulses;

FIG. 4 illustrates several stages of a selector switch drive; and

FIGS. 5 and 6 illustrate logical arrangements of switches and timing capacitors for controlling the width coding of the reference signals.

Throughout the drawings like reference numerals refer to like parts.

Figure 1:
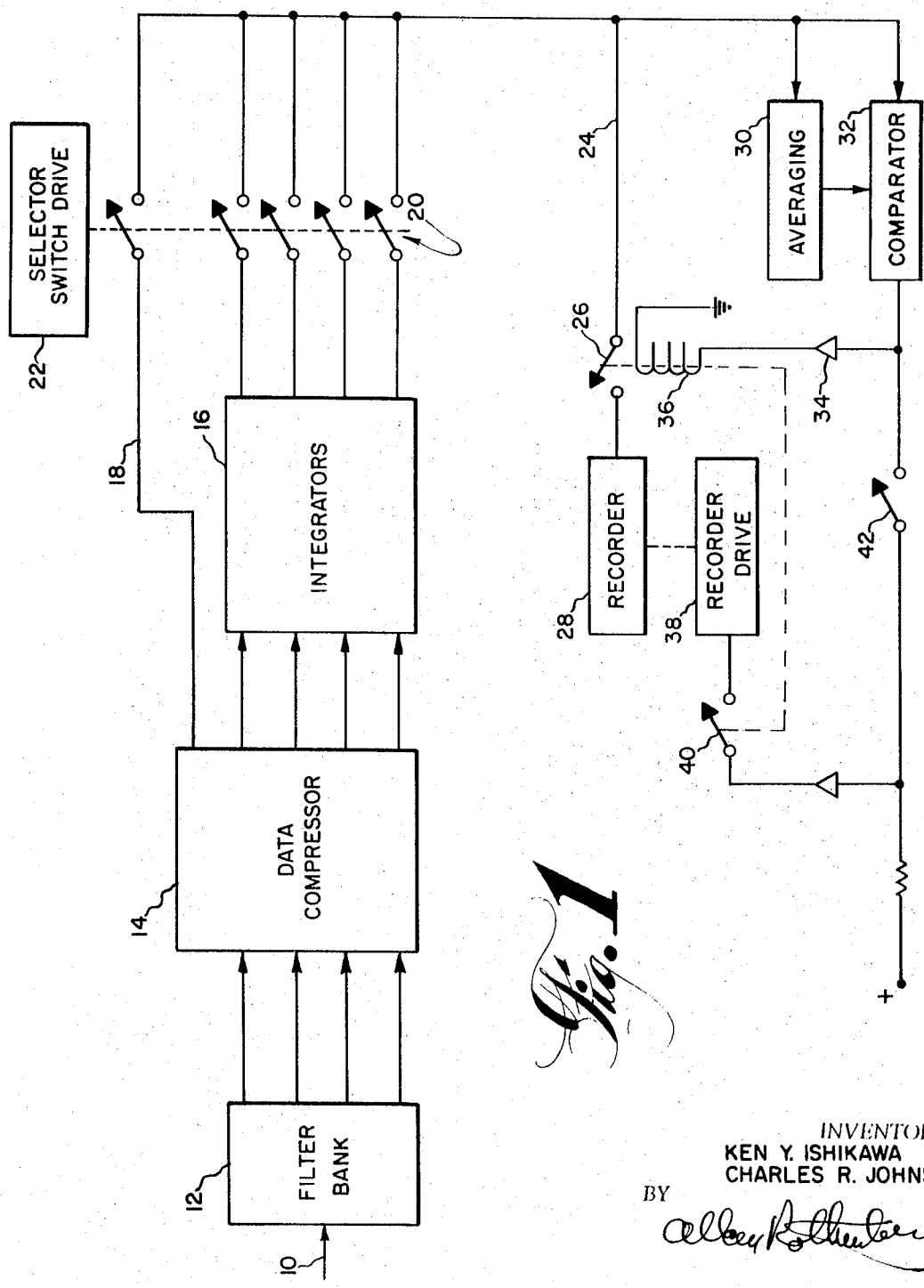
FIG. 1 is block diagram of a spectrum analyzer constructed according to the principles of this invention.

As illustrated in FIG. 1, an input signal from magnetotelluric sensors or electric potential ground probes is provided at a system input 10 and fed to a filter bank 12 comprising a number of narrow band filters to separate the incoming signal 10 into a predetermined number of components of identified frequency. Four such components are illustrated for purposes of exposition although, as will be readily appreciated, larger numbers of frequency components may be employed by the use of additional filters in the filter bank 12. In an exemplary arrangement for which the described system has been built, the expected signal variation will cover a frequency band of about 0.1 to about 0.8 Hz. and accordingly eight narrow bank filters are employed, each providing a unique frequency output in the ranges of eight equal steps of 0.1 Hz. each, starting with a lowermost frequency range of 0.05 to 0.15, up through a highest frequency range of 0.75 to 0.85 Hz. The output frequency components are fed from the filter bank 12 to a data compressor or data normalizer 14 from whence they are fed to the data processing circuitry comprising a series of integrators 16. The integrated or processed frequency component signals are fed together with a data-normalizing reference level signal provided on line 18 from the data normalizer 14 to a selector switch comprising a bank of switches 20 under control of a selector switch drive 22. The switch drive 22 causes the several outputs of processing circuit 16 together with the reference level signal on lead 18 to be sequentially applied via line 24 and switch 26 to a recorder or display device 28. The term recorder is used herein in a broad sense to include any of the well-known display or recording devices such as strip recorders, magnetic devices, oscilloscopes, or the like.

Since the described equipment may be employed for long term monitoring of geophysical phenomena, it is neither necessary nor desirable to record all of the input information. It is desired, for example, to record a sudden variation of magnetic or electrical signals that occur in the earth, these representing some phenomenon of interest which disturbs the earth's magnetic field. To this end the signals from the selector switch 20 are also fed to a signal-averaging circuit 30 and to a comparator 32. The comparator 32 receives from the averaging circuit 30 a signal representing the average over a predetermined time of all signals coming from the integrators 16 and compares this signal with the value of the output of integrators 16 at any instant. When this comparison is such that an anomaly or sudden variation of the information input is identified, the comparator provides an output via an amplifier 34 to energize a relay coil 36 and close switch 26 to thereby feed the information signals to the recorder. The comparator output also is caused to start the recorder by energizing the recorder drive 38 by closing of a second switch or set of relay contacts 40 that are also actuated (by a connection not illustrated) by energization of the coil 36. Suitable time delay means which may be built into the operation switches 26 and 40, for example, is provided in order to ensure recording of signals for some time after disappearance of the anomaly which causes the output from comparator 32. A manually controlled switch 42 may also be provided to override the comparator output and energize both the recorder information input and recorder drive upon command for the duration of the closing of the manual switch 42.

As illustrated in FIG. 2 the input signal is fed via an input amplifier 44 to the filters 12a, 12b, 12c and 12d of the filter bank which provide the several frequency components to the data-normalizing circuit 14 of a type that is shown with the greater detail in a copending application of K. Y. Ishikawa for DATA NORMALIZING APPARATUS, Ser. No. 842,502 filed July 17, 1969 and assigned to the Assignee of the instant application. The disclosure of such copending application is hereby incorporated herein in its entirety. Briefly, the data-normalizing circuit comprises a set of multiplexing switches 46, under control of a synchronous sequential switch drive 48, which feed the various information signals together with a reference level signal from a reference level generator 50 through an automatic gain control circuit 52 and thence to a switch 54, rectifier 56, and peak detector 58. The output of the peak detector is compared with a reference signal in a comparator 60, and then fed to control the gain of the gain control circuitry 52 and also fed to control the level of the signal provided by the reference level generator 50. That one of the multiplexor switches 46 connects the multiplexor input to the output of reference level generator 50 and the switch 54, between the gain control circuit 52 and the rectifier 56, are operated in mutually opposite phase so that the reference level signal is not fed to the rectifier and, conversely, when the reference level signal is not being fed to the multiplexor, the output of the gain control circuit is fed to the rectifier and to the peak detector. The signals at the output of rectifier 56 together with the reference signal at the output of the gain control amplifier 52 are fed in the sequence in which they are transmitted by the multiplexor 46 to a bank of switches of a decoder 62, which are also driven in a selected order by the synchronous sequential switch drive 48 in synchronism with the switches of multiplexor 46.

The reference signal fed via the first switch of the decoder switch bank 62 is fed to a reference level amplifier 64. The outputs of each of the other switches of decoder switch bank 62 is fed to an individual one of a series of integrators 66, 68, 70 and 72 which are particularly designed to perform the data processing, that provides desired information for use in the analysis of the energy and frequency spectrum.

The several outputs of reference amplifier 64 and integrators 66 through 72 are fed to switches 84, 86, 88, 90, 92 and 94, each comprising a field effect transistor, of a bank of selector switches that are driven in sequence from the selector switch drive 22 (FIG. 1) comprising a chain of monostable multivibrators 96 through 118 inclusive. The multivibrators are arranged in functional pairs although each multivibrator provides an output that triggers the next one, with a total of twelve monostable multivibrators in the illustrated chain. However, the time constants of the multivibrators are relatively long and relatively short for each pair, such as 96, 98, the pair 100, 102 and the pair 104, 106, etc. The purpose of this variation in time constant is to employ the second and shorter time period multivibrator of each pair, such as 98, 102, 106, etc., as an isolation interval generator between the on time of each of the switches of the selector switch bank 84 through 94. Thus, in an exemplary embodiment, multivibrator 96 may have an on time, an output to its associated switch 84, via lead 120, of 0.2 second, for example. Similarly the time of operation or conduction of each of the switches 86 through 94 may be controlled by the associated selector switch driving stage 100, 104, 108, 112 and 116 to provide a 0.2 second time during which the output of the individual associated integrating circuit will be provided at the output electrode of the field effect transistor that forms a switch. Since it is the output, as on lead 120, for example, from the relatively long period multivibrator of each pair that turns on its associated switch, and since no output to any of the switches is provided during the on-time of the short period associated multivibrator such as 98, 102, 106, 110, 114 or 118, there is provided a relatively short isolation period, on the order of 0.05 second, for example, between each on-time of each of the switches of the selector bank. This enables a visual resolution of the information displayed on the recorder. The presence of the intermediate or short period multivibrator stages 98, 102, 106, etc., actually provides a time separation between the several pulses that are displayed or recorded on the recorder.

This time separation is illustrated, for example, in FIGS. 3a through 3d which show reference pulses $r_1$ and $r_2$ having widths coded to identify the range of data normalization provided by the normalizer 14 and also showing four exemplary frequency component pulses $f_1, f_2, f_3$ and $f_4$. In FIG. 3a each of the pulses illustrated are of equal width separated by a short interval provided for purposes of visual resolution by means of the relatively short time interval secondary multivibrators 98, 102, 106, etc. In FIG. 3a each of the reference pulses $r_1$ and $r_2$ is of equal width having the narrower of its two possible widths. In order to indicate a second reference level range, as will be more particularly described below, the width of pulse $r_2$ is increased, doubled in this example, whereas the width of $r_1$ remains the same. Although these reference pulses in FIG. 3b thus indicate a second range of normalization and a second range of input information signals, the information pulses $f_1, f_2, f_3$ and $f_4$, still occupy substantially the maximum height of the display area available because of the normalization that has been achieved.

It may be pointed out at this time that whereas the incoming signal applied to input amplifier 44 is generally of a slowly sinusoidally varying continuous nature, the operation of the data normalizer provides relatively short bit samples, on the order of 2-millisecond duration, each as a series of pulses which are normalized by the gain control. This serial train of 2-millisecond pulses is provided as a set of parallel pulses by means of the normalizer decoder 62. The parallel trains of relatively short pulses at the outputs of each switch of decoder 62 (other than that which passes the reference) each comprises a normalized version of the original frequency component input at individual filter, but reconstructed from the multiplexor samples. These normalized reconstructed signals of a specified frequency component are then fed to the integrating circuits which integrate these values over a period of some b 20 to 30 seconds to provide in effect a continuous output that is presented to the drain electrodes of the field effect transistor switches 88 through 94. These integrator outputs are sampled one at a time for a serial presentation via a resistance capacitance circuit 124 and amplifier 126 to the recorder 28 as described in connection with FIG. 1.

Referring again to FIG. 3 and more particularly to FIG. 3c, a third range of normalization is illustrated wherein the reference pulse $r_1$ has an increased or double width, whereas $r_2$ has its narrow width. In FIG. 3d the fourth level of amplitude range is illustrated wherein both reference pulses $r_1$ and $r_2$ have their greater width to thereby indicate this reference level. In each of these situations the exemplary input pulses $f_1, f_2, f_3$ and $f_4$ preferably have a duration on the order of 0.2 second whereas the reference pulses have a duration of either 0.2 or 0.4 second as indicated.

The arrangement for coding the width of the reference signals is more particularly illustrated in connection with FIGS. 4, 5 and 6 of which FIG. 4 shows the first three stages 96, 98, 100 of the monostable multivibrator selector switch drive. Monostable multivibrator 96 comprises a pair of transistors 130 and 132 having cross-coupled base to collector electrodes and including a primary timing capacitor 134 and a secondary timing capacitor 136 controlled by a switch schematically illustrated at 138. The capacitance connected between the collector electrode of transistor 132 and the base electrode of transistor 130 determines the on time of the multivibrator, that is, the time during which an operating signal is fed to its associated field effect switch. The output of stage 96 is capacitatively coupled from the collector electrode of transistor 130 to the input of the short period or isolation multivibrator stage 98 and to the gate electrode of switch 84. This stage and all other multivibrators of the chain, except multivibrator 100, are substantially identical in configuration to stage 96 except that stage 98 and the others have but a single time-controlling capacitor since they need not have a variable timing period. The output of multivibrator stage 98, a pulse indicating the termination of the on time of multivibrator 98, is fed as an input to the succeeding stage 100 at the collector of transistor 140, which together with a second transistor 142, having cross-coupled base to collector electrodes, comprises the control for the second switch 86 of the two reference pulse switches. The period of stage 100 is controlled by a primary capacitor 144 and a secondary capacitor 146 that are controlled by a switch schematically illustrated at 148.

As illustrated in FIG. 5 the two capacitors are controlled by a logical arrangement of switches to provide four different coding widths of the reference signal, that is, four different combinations of the time periods of the two multivibrators 96 and 100 are achieved. In a first coding arrangement representing a first level of reference pulse, all switches 138a, 138b, 138c, and 148a are in the position illustrated in FIG. 5. Switch 148a corresponds to switch 148 of FIG. 4 and switches 138a through 138c collectively corresponding to switch 138 of FIG. 4. For the second level of reference pulse, switch 148a is caused to be closed to put capacitor 146 into the circuit of multivibrator 100 to thereby increase its period. For the third reference level switch 138a is closed to put capacitor 136 into the circuit of multivibrator stage 96 and simultaneously switch 148b is opened to remove capacitor 146. For the fourth level of reference pulse, switch 148c is closed to cooperate with the switch 148a, remaining closed from the second level, to again put the capacitor 146 into the circuit of multivibrator 100 so that both multivibrators now have greater time periods.

The operation of switches 138a and 148a, b and c is achieved by means or relay coils 150, 152 and 154 which collectively provide a range signal to operate the switches 148a, 138a, 148b and 148c as illustrated in FIG. 6 and which coils form part of the reference level generator circuit as more particularly described in the aforesaid copending patent application of Ishikawa.

It may be noted that the reference level generator 50 provides a range signal that indicates the absolute magnitude of the reference signal. This range signal is not employed to control the multiplexor or demultiplexor as in the copending application of Ishikawa, but is uniquely employed to control the reference encoding switches 84, 86 of the selector switch bank. This arrangement for encoding after the normalizer enables the reference pulse display to more meaningfully relate to and to be presented with the displayed processed information signals.

In order to prevent the comparator 32 of FIG. 1 from operating in response to the reference signals, the output of multivibrator stages 98 and 100 are both fed to disabling circuitry (not shown) of the comparator.

Where all multivibrators of the selector switch drive have similar monostable circuits, there is provided a system-timing arrangement in the form of an astable or free-running multivibrator 95 (FIG. 2) which is connected to cyclically initiate the selector drive sequence by providing a trigger to the input of multivibrator stage 96 at the collector of transistor 132.

It will be seen that there has been described an improved real-time spectrum analyzer which employs a data-normalizing arrangement to receive all incoming signals and provide these with magnitudes having known amounts of compression or expansion to enable processing of these signals by the data handling integrators of the analyzer. An improved selector switch arrangement is provided to present the processed data signals for recording or display and at the same time to minimize crosstalk between adjacent channels by providing isolation between the display pulses. Additionally the selector drive is arranged to provide the width coding of reference level pulses that identifies absolute magnitudes of the information signals together with the range of levels thereof.

What is claimed is:

1. A spectrum analyzer comprising:
    means for accepting a variable input signal that varies in magnitude and frequency with respect to time;
    filter means for separating the input signal into a selected number of frequency bandwidths and for outputing each bandwidth along a separate conducting path;
    a variable gain controllable amplifier;
    a peak detector coupled to the output of said amplifier for detecting the amplitude of the output thereof and producing a peak signal indicative of the output amplitude of the amplifier;
    means for providing a reference signal with a given amplitude;
    a comparator for comparing the reference signal to the peak signal and producing a comparative signal indicative of the difference thereof;
    said amplifier having means responsive to the comparative signal for controlling the gain thereof;
    a recycling input multiplexer for coupling, in turn, each bandwidth from said filter means and said reference signal to said amplifier;
    a plurality of signal integrators equal in number to at least one more than the number of said bandwidths;
    a demultiplexer synchronized with the input multiplexer to couple the output of said amplifier selectively to said integrators so that each amplified signal, representing a particular bandwidth and representing the reference signal, is, respectively, coupled to the same integrator;
    a recorder, a band of selector switches wherein at least one selector switch interconnects a respective integrator with said recorder;
    a selector switch drive for operating the selective switches to couple the outputs of said integrators, one at a time, to said recorder;
    said switch drive having means that is responsive to the comparative signal for varying the on-time of the selective switch disposed between the recorder and the integrator to which said amplified reference signal is coupled by said demultiplexer so that the time width of the recorded reference signal denotes the degree of amplification that the recorder signals following in time were amplified.

2. The analyzer of claim 1 wherein:
    at least two selector switches are connected in parallel between said recorder and the integrator to which said amplified reference signal is coupled, and
    said means, for varying the on-time of the selector switch, is limited to vary the on-time of said at least two switches between one of two fixed time increments so that the degree of amplification is digitally indicated by the outputs of two said switches.

3. The analyzer of claim 2 wherein said switch drive further comprises:
    a chain of monostable multivibrators of which alternate stages are connected to individual ones of said selector switches whereby, when said multivibrators are operated in sequence, each in response to the output of another, and whereby the switches are operated in sequence upon occurrence of the output of alternate ones of said selector switch drive multivibrators, and whereby, during intervals of operation of the other multivibrators of the chain, all switches remain unoperated; and wherein
    said means for varying the on-time varies the on-time of one of the stages of at least two of the multivibrators.

* * * * *